United States Patent
Lang et al.

(10) Patent No.: US 6,802,578 B1
(45) Date of Patent: Oct. 12, 2004

(54) DRAWER

(76) Inventors: Alison C. Lang, 11225 N. 112$^{th}$ East Ave., Owasso, OK (US) 74055; Ricky L. Lang, 4538 E. 5$^{th}$ Pl., Tulsa, OK (US) 74010

( * ) Notice: Subject to any disclaimer, the term of this patent is extended or adjusted under 35 U.S.C. 154(b) by 188 days.

(21) Appl. No.: 10/177,355

(22) Filed: Jun. 21, 2002

Related U.S. Application Data

(63) Continuation-in-part of application No. 09/599,019, filed on Jun. 22, 2000, now abandoned.
(60) Provisional application No. 60/139,888, filed on Jun. 22, 1999.

(51) Int. Cl.$^7$ ................................................ A47B 83/00
(52) U.S. Cl. ................. 312/235.1; 312/278; 312/330.1
(58) Field of Search ............................. 312/235.1, 278, 312/330.1, 333, 204, 228, 902, 319.1, 334.1, 334.7, 334.44, 350

(56) References Cited

U.S. PATENT DOCUMENTS

| | | | | |
|---|---|---|---|---|
| 1,849,809 A | * | 3/1932 | Showers | ............. 312/319.1 X |
| 2,872,178 A | * | 2/1959 | Holland | |
| 2,924,443 A | * | 2/1960 | Townsend et al. | |
| 3,027,215 A | * | 3/1962 | Duncan | ...................... 312/245 |
| 4,288,131 A | * | 9/1981 | Griffin | ........................ 312/245 |
| 4,494,806 A | * | 1/1985 | Williams et al. | ............ 312/333 |
| 4,895,008 A | * | 1/1990 | Blake | .................. 312/319.1 X |
| 5,096,275 A | * | 3/1992 | Pappas | ....................... 312/312 |
| 5,277,487 A | * | 1/1994 | Simon | .................... 312/228 X |
| 5,706,678 A | * | 1/1998 | Sasaki | .................... 312/228 X |
| 5,755,498 A | * | 5/1998 | Cutler | .................... 312/235.1 |
| 5,857,757 A | * | 1/1999 | Bieker et al. | ........... 312/902 X |
| 6,224,176 B1 | * | 5/2001 | Suzuki | ................ 312/330.1 X |
| 6,371,584 B1 | * | 4/2002 | Alreck | .................... 312/235.1 |

FOREIGN PATENT DOCUMENTS

| | | | | |
|---|---|---|---|---|
| DE | 2245600 | * | 3/1974 | ............. 312/319.1 |
| WO | WO 97/41048 | * | 11/1997 | |

* cited by examiner

*Primary Examiner*—James O. Hansen
(74) *Attorney, Agent, or Firm*—Capehart Law Firm PLLC; Brent A. Capehart

(57) ABSTRACT

A drawer assembly comprising a conventional stationary cabinet having a base portion having a frame assembly therein and a drawer slidably mounted in the frame assembly. The drawer having a bottom positioned substantially at a support floor surface level for enabling the drawer to rest substantially at ground level in a fully opened position.

3 Claims, 6 Drawing Sheets

DRAWER

CROSS-REFERENCE TO RELATED APPLICATION

This application is a CIP of U.S. patent application Ser. No. 09/599,019 filed Jun. 22, 2000 now abandoned which is based on U.S. Provisional Patent Application Ser. No. 60/139,888 filed Jun. 22, 1999 both of which are entitled SCALE DRAWER.

BACKGROUND OF THE INVENTION

1. Field of the Invention

The present invention relates generally to a cabinet drawer and, more particularly, to a drawer slidably mounted in a base portion of a conventional stationary cabinet, for storing and hiding household items, such as a weighing scale.

2. Description of Related Art

Household items, such as weighing scales, present both a nuisance and hazard by occupying space on the floor, frequently in a position which is not readily observed due to low height, for example. They are frequently tripped over unintentionally, causing personal injury and property damage as well. No satisfactory attempts have been offered heretofore to eliminate this hazard and nuisance, other than to pick up the items and place them in a linen or clothes closet or the like, or slide them under a bed, chest, or otherwise, an inconvenient exercise at best.

Several inventions describe known apparatuses for storing such items. For example, U.S. Pat. No. 2,872,178 issued to J. D. Holland on Feb. 3, 1959 describes a flush type wall cabinet having a storage area for supporting a weighing scale electively in operative and non-operative positions. U.S. Pat. No. 2,924,443 issued to W. C. Towsend et al. describes a bathroom type scale designed and constructed for pivotal movement into a wall recess during periods of non-usage. U.S. Pat. No. 3,027,215 issued to A. W. Duncan on Mar. 27, 1962 describes a door or wall mounted scale cabinet for supporting and storing a bathroom-type weighing scale when not in use. U.S. Pat. No. 4,288,131 issued to Griffin on Sep. 8, 1981 describes a cabinet retractable cabinet mounted bathroom scale including a cabinet or housing mounted to or, recessed into a wall and a conventional spring-type bathroom scale having its rear end pivotally mounted to the housing.

However, none of the above inventions describe a drawer slidably mounted in a base portion of a conventional stationary cabinet or the like. There is a need to provide an efficient and effective cabinet to store household items.

BRIEF SUMMARY OF THE INVENTION

The present invention relates generally to a cabinet drawer and, more particularly, to a drawer slidably mounted in a base portion of a conventional stationary cabinet, for storing and hiding household items, such as a weighing scale.

One aspect of the present invention is a drawer assembly comprising a conventional stationary cabinet having a base portion. The base portion has a frame assembly therein with a drawer slidably mounted in the frame assembly. The drawer has a bottom positioned substantially at the ground level for enabling the drawer to rest substantially at ground level in a fully opened position.

As used herein, the term conventional stationary cabinet means a non-portable cabinet placed in a room, such as a bathroom, so as to become a permanent fixture of that room.

Another aspect of the present invention is a drawer assembly as described above further comprising a standard weighing scale located within the slidably mounted drawer.

Another aspect of the present invention is a drawer assembly as described above wherein the frame has a pair of slide mechanisms, one for each side of the drawer. The slide mechanisms are dimensioned and configured such that the drawer may be fully extended from said frame to fully expose a standard weighing scale therein so that the scale may be stood upon without need of removing the scale from the drawer.

Another aspect of the present invention is a drawer assembly as described above wherein the drawer bottom has at least a pair of support pads thereon, for contacting a floor surface and supporting the drawer when weight is placed on the drawer.

Another aspect of the present invention is a drawer assembly as described above wherein the drawer has a releasable locking mechanism for releasably locking the drawer in a fully closed position or a fully opened position.

Further objects and features of the present invention will be apparent to those skilled in the art upon reference to the accompanying drawings and upon reading the following description of the preferred embodiments.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
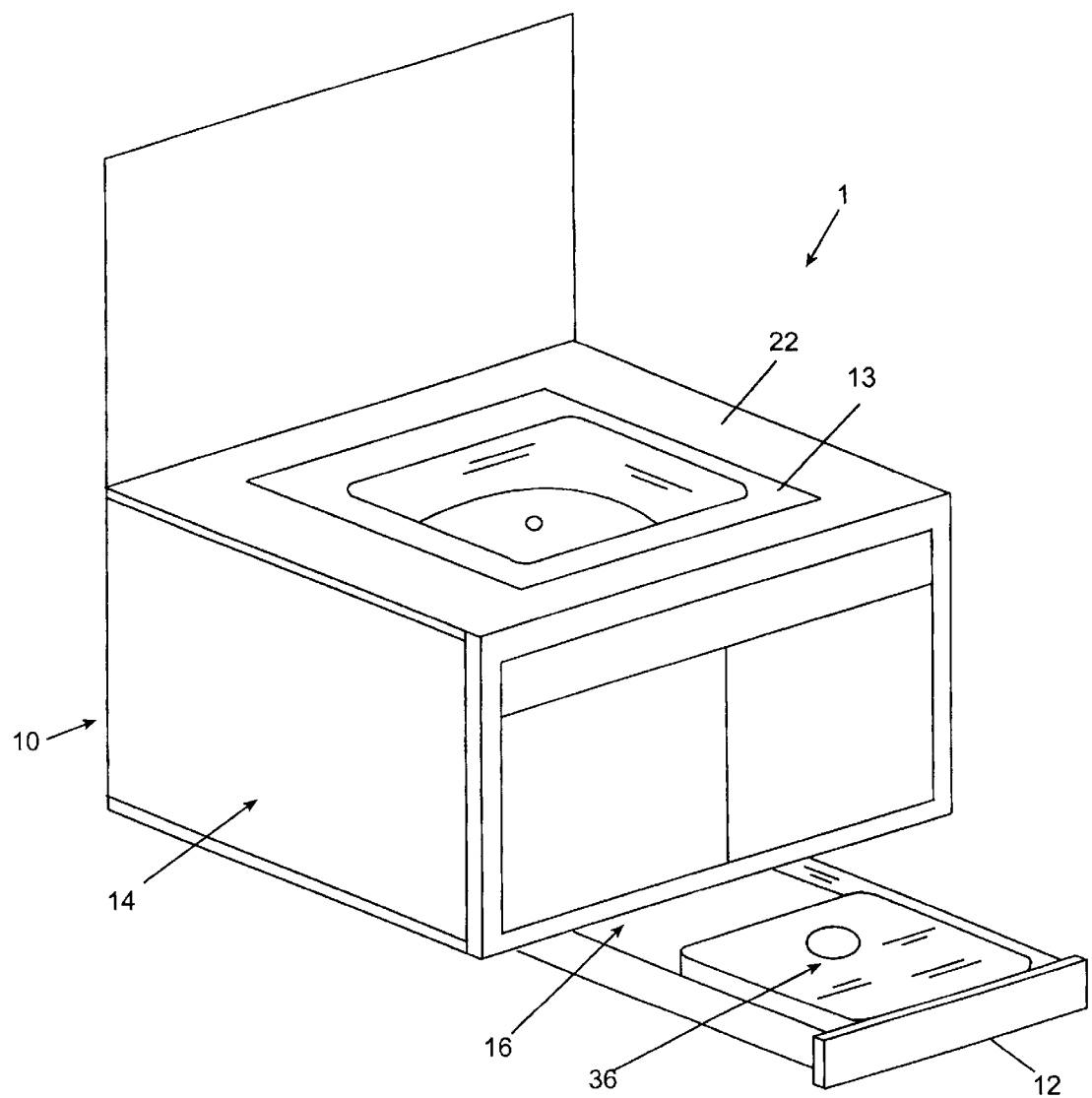
FIG. 1 is perspective view of an embodiment of the improved drawer according to the present invention.
Figure 2:
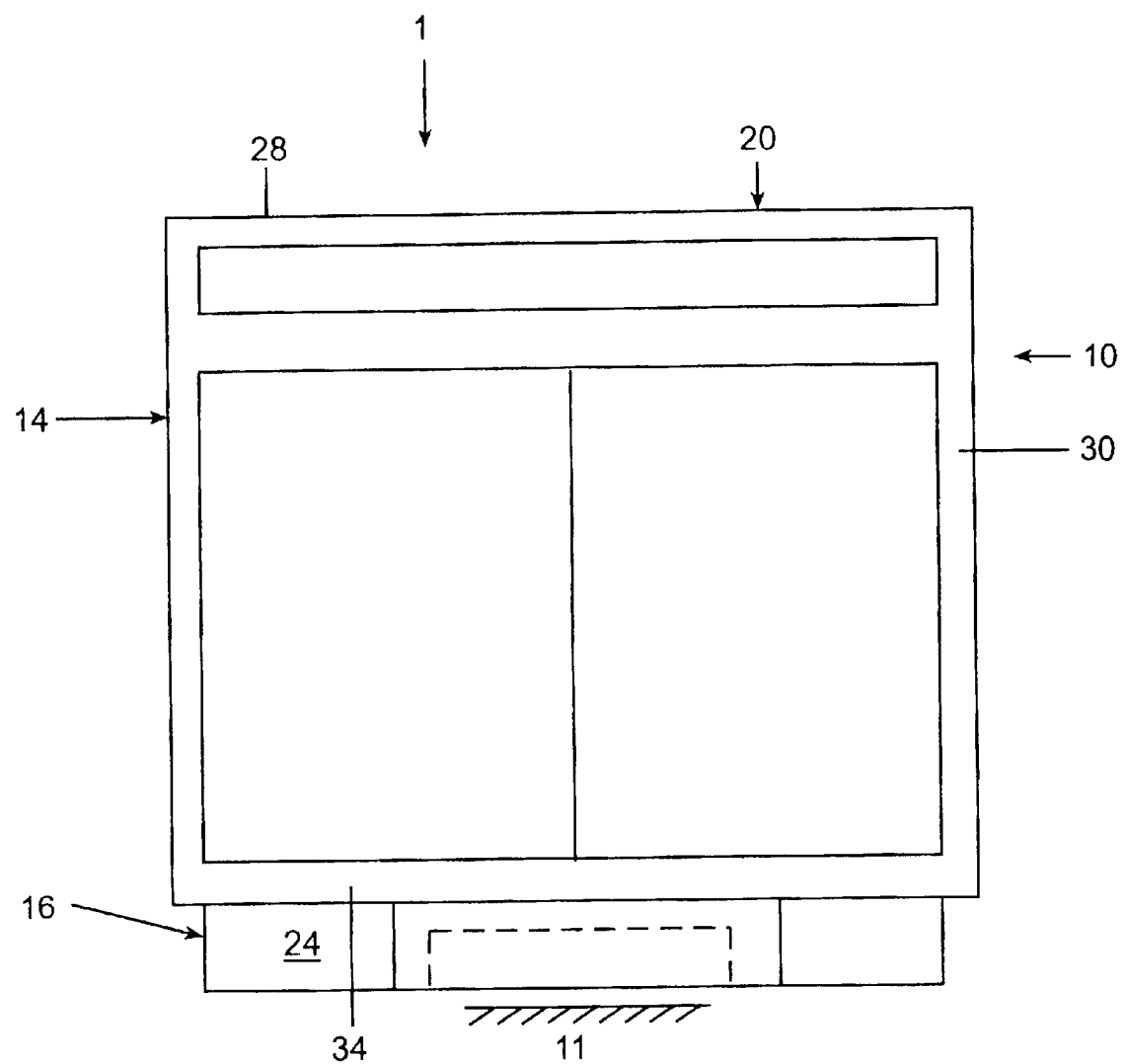
FIG. 2 is a front elevation view of the improved drawer shown in FIG. 1.

Before explaining the present invention in detail, it is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein are for the purpose of description and not of limitation.

As depicted in the figures, an embodiment of the present invention is a drawer assembly 1 comprising a conventional stationary cabinet 10 having a base portion . The base portion 16 has a frame assembly 18 therein with a drawer 12 slidably mounted in the frame assembly 18. The drawer 12 has a bottom 17 positioned substantially at the ground level for enabling the drawer 12 to rest substantially at ground level of a support surface (e.g. a bathroom floor) 11 in a fully opened position.

As used herein, the term conventional stationary bathroom cabinet means a non-portable cabinet placed in a room, such as a bathroom, so as to become a permanent fixture of that room.

An embodiment of drawer 12 comprises a rear panel 42, two parallel side panels 44, and a front panel 46. The drawer 12 has inside dimensions defined by a width $W_d$ and $L_d$, each of which exceed the dimensions of a conventional household weighing scale 36, for enabling items, such as a conventional household weighing scale 36, to fit inside 25 of the drawer 12.

An embodiment of frame 18 comprises a rigidly attached to each vertical side wall 30 underneath the intermediate horizontal wall 34 to provide a structure from which the drawer 12 may be slidably supported. Each frame 18 forms an inner vertical surface 38 from which a conventional track mechanism 26 may be attached to slidably attach the drawer 12 to the frame 18.

An embodiment of cabinet 10 comprises a top horizontal wall 28, two vertical side walls 30, a bottom horizontal wall 32, and an intermediate horizontal wall 34. The top horizontal wall 28, the two vertical side walls 30, and a top surface of the intermediate horizontal wall 34 collectively define an open space (not shown) forming a storage portion 14 of the cabinet 10. In this embodiment, the storage portion is identical in size to the inside of a conventional bathroom storage cabinet for use in storage of household accessories. The intermediate horizontal wall 34 serves to provide a flat surface on which household accessories may be placed for storage.

An embodiment of base portion 16 comprises a portion of each verticals side wall 30 extending beneath the intermediate horizontal wall 34 to forming a space underneath. Preferably, the base portion 16 is sized like a conventional base portion of a conventional bathroom cabinet. In this embodiment, a front end of the base portion 16 is recessed inwardly relative to the storage portion 14 for providing a space underneath the storage portion 14, where a person's feet may be positioned while standing next to the cabinet 10 to use the sink 13.

Another embodiment of the present invention comprises the embodiment described above further comprising a conventional household weighing scale 36 located within drawer 12.

Figure 3:
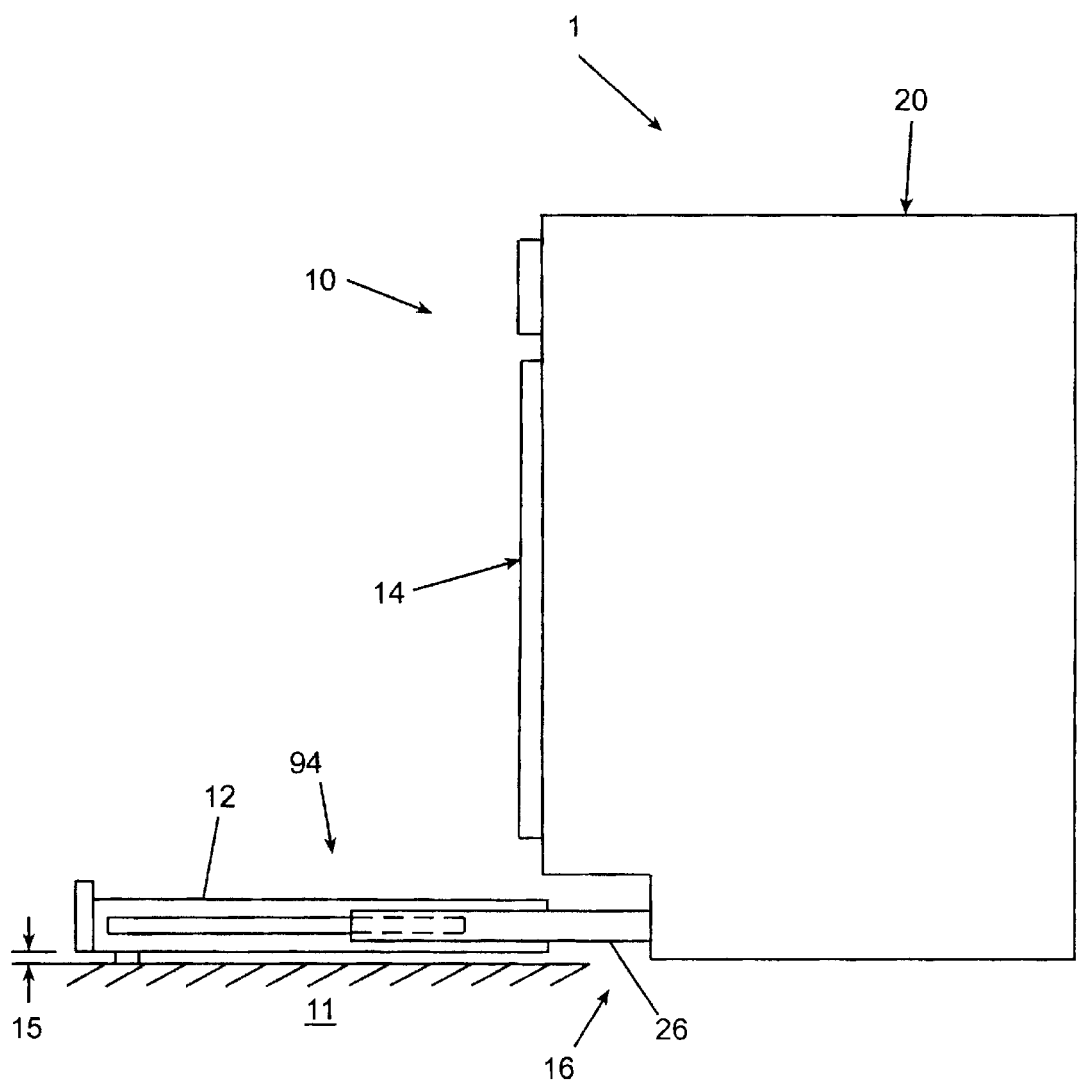
FIG. 3 is a side elevation view of the improved drawer shown in FIGS. 1 and 2, with the drawer in an open position.
Figure 4:
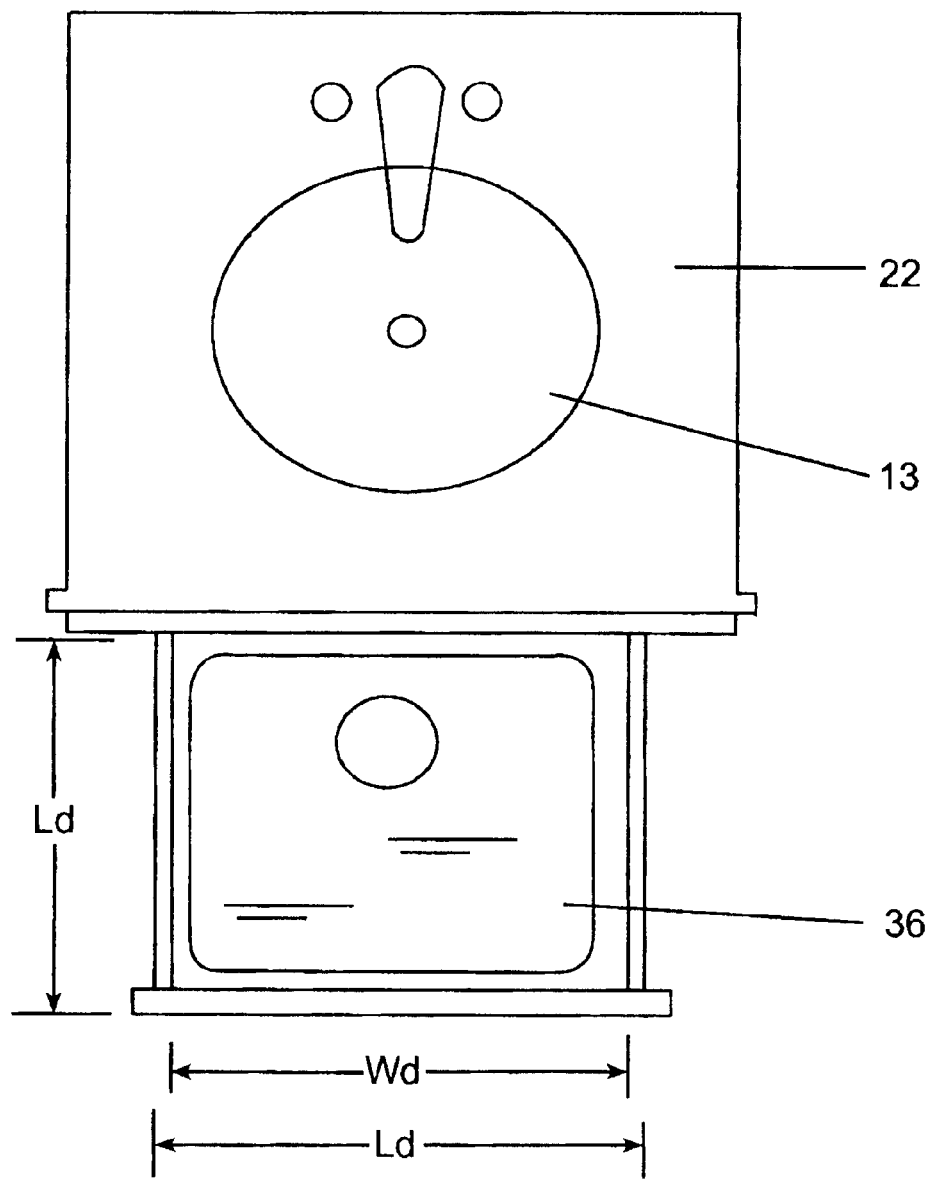
FIG. 4 is a top, plan view of the improved drawer as shown in FIG. 3.
Figure 5:
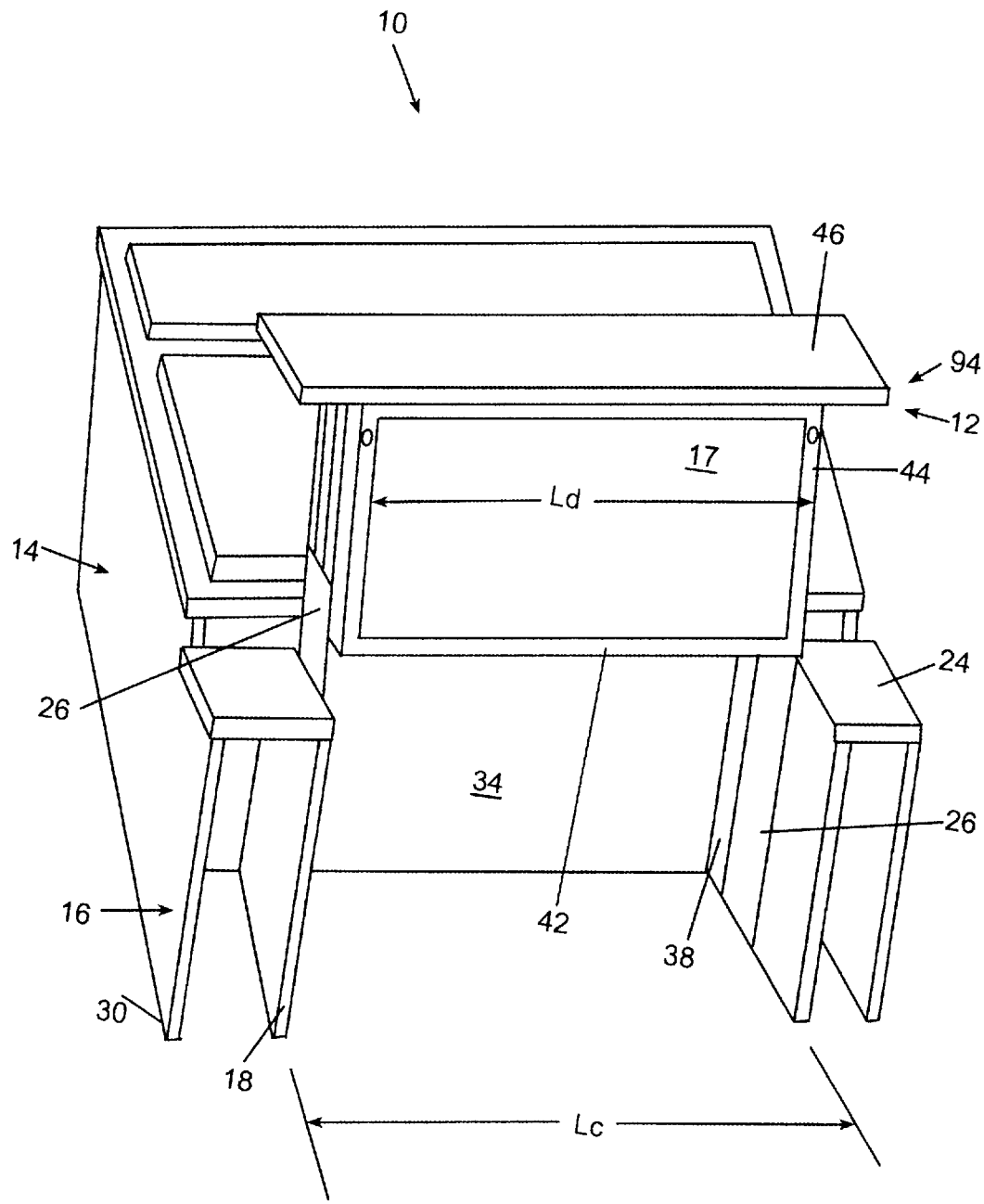
FIG. 5 is a perspective view of the underside of the improved drawer as shown in FIG. 1.

Another embodiment of the present invention comprises the embodiment described above further comprising a plurality of pads 39 attached to a bottom surface 17 of the drawer 12 for providing additional support for the drawer 12 in a fully opened position 94 (see FIGS. 3 and 5). In this embodiment, the pads 39 are made of rubber or other suitable material and a clearance of approximately ⅛" exists between the bottom of the pads 39 and the support surface 11. This provides sufficient clearance for the drawer to be easily opened and closed while providing enough support for a person standing on a weigh scale 36 while it remains in the drawer. As can be appreciated from FIG. 3, there is enough "slop" in the construction of the drawer such that a slight movement down when the scale is used can be provided without in any way compromising the structural integrity of the entire structure.

In another embodiment of the present invention, the drawer 12 has a simple handle on the front face thereof, for easily opening and closing the drawer by hand or foot.

Figure 6:
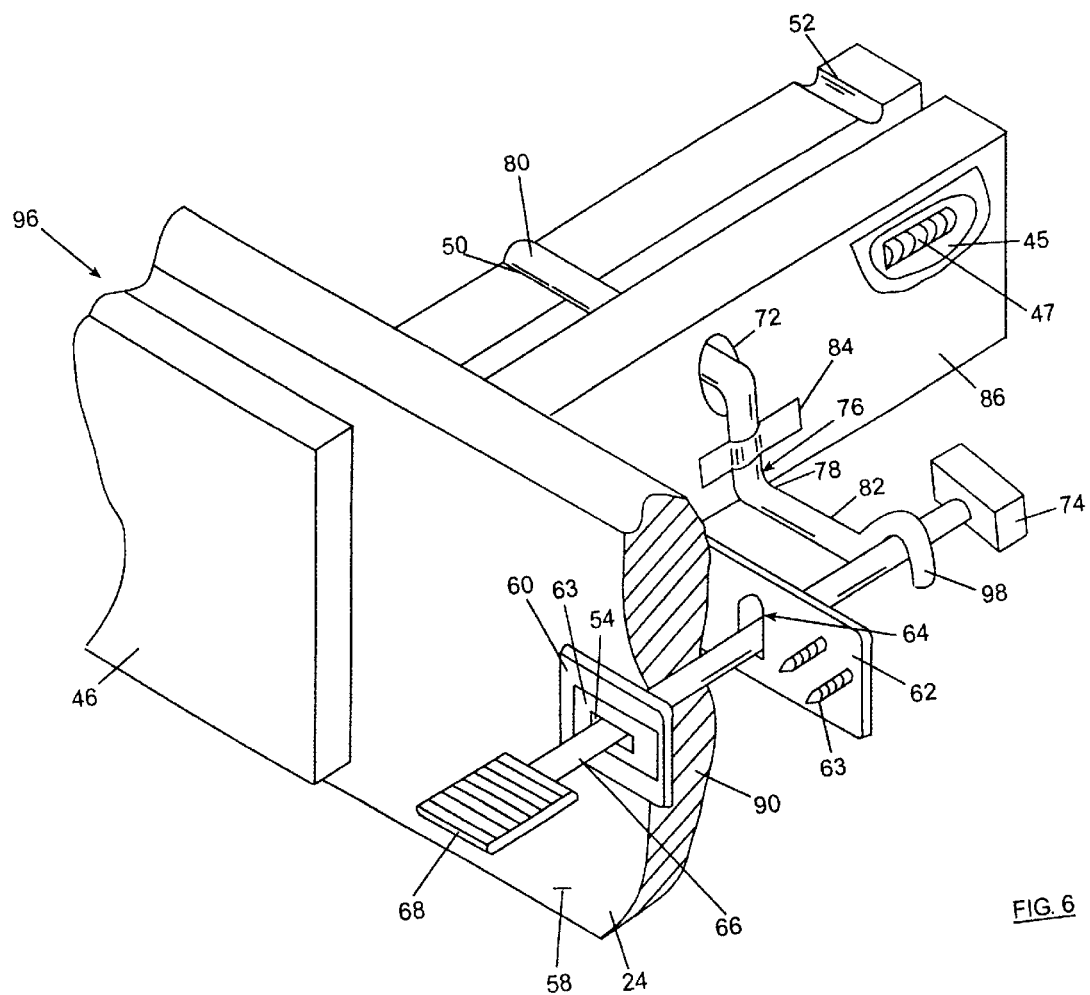
FIG. 6 is an enlarged scale, partially fragmented perspective view of an embodiment of a latch or lock mechanism aspect of an embodiment of the present invention.

An additional embodiment of the present invention provides for a latch or lock assembly comprising a conventional spring-loaded mechanism 47, as shown in FIG. 6, attached to an outside surface 45 of each of the side panels 44 for maintaining a constant outward force on the drawer 12, to automatically open the drawer to a fully opened position 94 upon release of a latching or locking mechanism in the drawer 12.

A front wall 24 may be affixed to a front end 40 of the base portion 16, in a flush manner for providing a smooth finish at the front end 40. A first hole (not shown) may be formed in the front wall 24 for receiving a member through the front wall 24.

A first mounting bracket 60 having a second hole 54 therethrough is affixed to a front side 58 of the front wall 24 for providing a cover around a hole formed in a cabinet. The first mounting bracket 60 is defined by an outer portion 61 and an inner portion 63 surrounding the second hole. The inner portion 63 is integrally attached to the outer portion 61. The outer portion 61 is made of a rigid material to enable the bracket 60 to confine movement of a member within the mounting bracket. The inner portion 63 is made of a deformable material for permitting a member inserted through the second hole 54 to move radially outward from the second hole 54.

A second mounting bracket 62 having a vertical slot 64 formed therein is affixed to a rear side (not shown) of the front wall 24 for providing a stationary means for confining movement of a member inserted through the front wall 24. In this embodiment, the second mounting bracket is attached to the rear side (not shown) of the front wall 24 by conventional attachment means, such as wood screws 63.

Formed on an upper surface 48 of one of the side panels 44 are a first elongated indentation 50 and a second elongated indentation 52 for receiving a locking member to lock the drawer 12 in a fixed position. A third hole 72 is formed in one of the drawer frames 18 adjacent the side panel 44 having a first and second elongated indentation for permitting a rod-like member to pass through the drawer frame 18 and into one of the elongated indentations (50,52). According to this embodiment, the third hole 72 is positioned in the drawer frame 18 such that the third hole 72 is co-linear with the first elongated indentation 50 when the drawer 12 is positioned in a fully closed position 96 and the third hole 72 is co-linear with the second elongated indentation 52 when the drawer is positioned in the fully opened position 94.

A releasing rod 66 may be inserted through the second hole 54 and passed through the vertical slot 64 to enable a person to access an internal locking mechanism. The releasing rod 66 has a pedal 68 rigidly attached to one end thereof for enabling a person to adjust the position of the releasing rod 66 by using the person's foot. The releasing rod 66 is positioned in the second hole 54 such that the pedal 68 remaining outside of the first mounting bracket 60 so that the pedal 68 is always accessible to a person's foot.

A plurality of threads 70 are formed at an opposing end of the releasing rod 66 for enabling a conventional nut to be threaded thereto. A conventional nut 74 may be threaded to the threads 70 to prevent the releasing rod 66 from being removed from the second mounting bracket 60. The combination of the releasing rod 66 and the nut 74 have sufficient weight to ensure that the releasing rod 66 rests stably on the bottom of the vertical slot 64 with the pedal 68 positioned outside of the front wall 24.

A rigid member 90 may be affixed by conventional means to an inside portion of the front wall 24 to provide a fixed support about which the releasing rod 66 may pivot. The rigid member 90 is oriented in the direction of a horizontal axis traveling parallel to the front wall 24 so the rigid member 90 may serve as a fulcrum for when the releasing rod 66 is pressed downward using the pedal 68.

A locking rod 76 may be inserted through the third hole 72 and received in the first elongated indentation 50 or the second elongated indentation 52, depending on whether the drawer 12 is positioned in a fully closed or fully opened position 94. The locking rod 76 has a cranked shape defined by a crank arm portion 78, a first horizontal portion 80, and a second horizontal portion 82. The crank arm portion 78 may be attached to the drawer frame 18 by an Ω-shaped mounting bracket 84 for permitting the locking rod 76 to be slid against an outer surface 86 of a drawer frame 18. The Ω-shaped mounting bracket 84 may be attached to the drawer frame 18 using conventional wood screws.

The first horizontal portion 80 has sufficient length to be able to extend over the full width of the drawer frame 18 when inserted through the third hole 72 for enabling the locking rod 76 to be fully received into the first elongated indentation 50 or the second elongated indentation 52 for purposes of locking the drawer 12 in a fully closed or fully opened position 94, respectively.

The second horizontal portion 82 may have a bent portion 98 at one end thereof for enabling the locking rod 76 to rest on top of the releasing rod 66. In this embodiment, the bent portion 98 has an upside down "U" configuration for enabling the bent portion 98 to engage the releasing rod 66. The crank arm portion 78 preferably has a length $L_{CA}$ dimensioned such that the first horizontal portion 80 rests inside one of the elongated indentations (50,52) when the second horizontal portion 82 rests on top of the releasing rod 66 in a rested state.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

We claim:

1. In combination, a drawer assembly and cabinet base for holding a weighing scale comprising:

a cabinet base having a front wall having a hole therethrough;

a frame assembly located within said cabinet base;

a drawer having a rear panel, two parallel side panels, a front panel and a bottom defining a space to hold said weighing scale therein, said bottom positioned substantially at a support floor surface level for enabling said drawer to rest substantially at ground level in a fully opened position, one of said two parallel side panels of said drawer having a first elongated indentation and a second elongated indentation, a conventional track mechanism attached to said frame assembly and said drawer thereby allowing said drawer to slidably extend from and retract into said frame assembly; and a spring-loaded locking mechanism attached to said two parallel side panels for maintaining a constant outward force on said drawer said spring-loaded locking mechanism being defined as having a releasing rod extending through said hole located within said front wall of said cabinet base, said releasing rod having a pedal located outside said front wall for enabling a person to adjust the position of said releasing rod by using the person's foot; and a locking rod connected to said releasing rod and being received into said first elongated indentation when said drawer is in a fully closed position and being received into said second elongated indentation when said drawer is in a fully opened position.

2. The combination of claim 1 further comprising a weighing scale located within said drawer.

3. The combination of claim 2 wherein said drawer bottom further comprising at least a pair of support pads thereon for contacting a support floor surface and supporting said drawer when weight is placed on said drawer.

* * * * *